May 10, 1932.　　　J. W. VANDERVEER　　　1,857,747

METAL WHEEL

Filed Sept. 18, 1926

Jewell W. Vanderveer
INVENTOR.

BY
ATTORNEYS.

Patented May 10, 1932

1,857,747

UNITED STATES PATENT OFFICE

JEWELL W. VANDERVEER, OF ERIE, PENNSYLVANIA, ASSIGNOR TO ERIE MALLEABLE IRON COMPANY, OF ERIE, PENNSYLVANIA, A CORPORATION OF PENNSYLVANIA

METAL WHEEL

Application filed September 18, 1926. Serial No. 136,269.

This invention is designed to improve metal wheels particularly as to the construction and arrangement with relation to demountable rims. It is desirable in the forming of such wheels, particularly wheels carrying brake drums to permit of as large a drum as possible and still as much space between the drum and rims as practical in order to prevent heat transferring to the rim. It is also desirable to provide a simple and efficient mounting for the rim. Features and details of the invention will appear from the specification and claims.

The invention is illustrated in the accompanying drawings as follows:—

Figure 1:
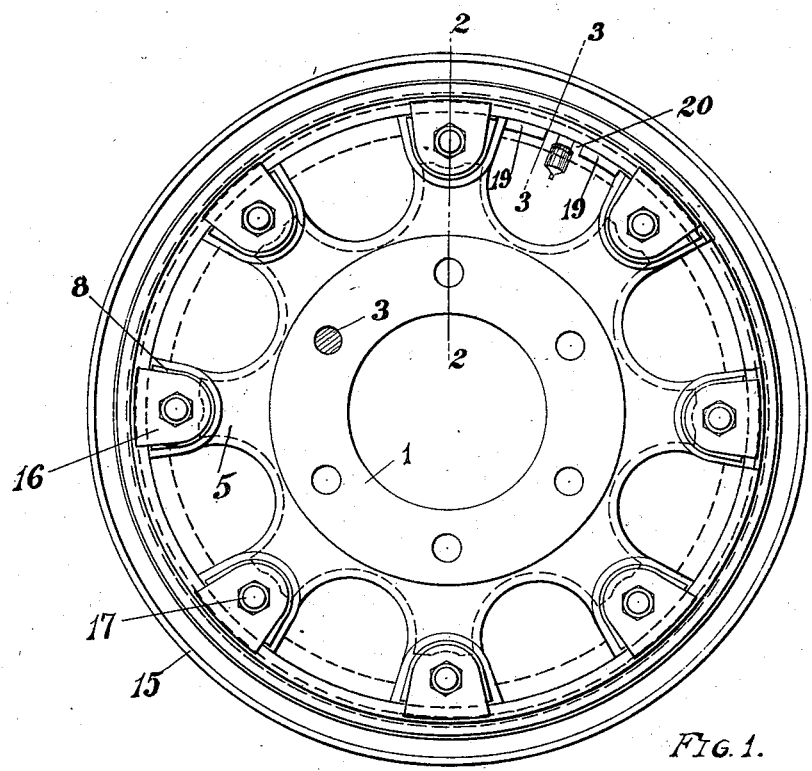
Figure 2:
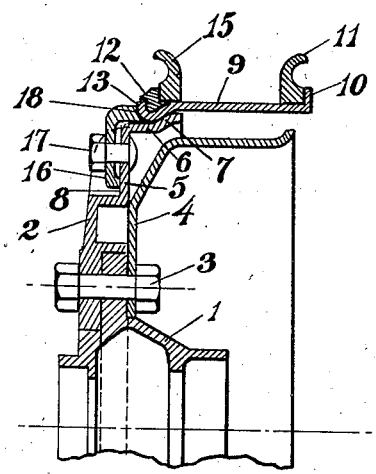
Figure 3:
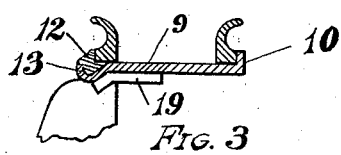

Fig. 1 shows a side elevation of a wheel.
Fig. 2 a section on the line 2—2 in Fig. 1.
Fig. 3 a section on the line 3—3 in Fig. 1.

1 marks the wheel hub, and 2 a spoke disc which is secured to the hub by means of bolts 3, the bolts passing through the shell of a brake drum 4 and securing it with the spoke disc. Spokes 5 extend from the spoke disc and are provided with the inwardly extending rim seats 6, these rim seats having the bevelled portions 7. The outer faces of the spokes are provided with clamping seats 8.

A rim 9 is of common construction having an inner shoulder 10 which is engaged by a removable shoulder 11 and a removable locking ring 12 at its outer edge which engages a shoulder 13 at the outer edge of the rim, the rim being beveled to conform to the bevel 7, the beveling of the rim forming a groove for receiving the ring 12. The ring 12 locks the removable rim side 15. The web formed by the walls of the groove together with the rim side 15 strengthens the rim opposite the beveled portion of the rim.

Clamps 16 are arranged on the clamping faces 8 and are secured by bolts 17 which extend through the spokes and the clamps. The clamp has an inwardly extending lip terminating in a beveled edge 18 which extends under the shoulder 13 so that as it is clamped the inwardly extending rib formed by the bevel 14 and shoulder 13 is clamped on its inner and outer faces between the bevel 7 and the beveled edges 18 of the clamps.

Driving plates 19 are secured to the rim and extend outwardly engaging the driving edges of the spokes. These plates are preferably provided at each side of the stem opening 20.

The rim shoulders 15 form reenforcing rings for the rim and the shoulder 15 directly over the beveled seat particularly is of importance in bracing and strengthening the rim at this point.

What I claim as new is:—

1. In a wheel, the combination of a wheel center comprising spokes having beveled seats on the spoke ends, said spokes being separated one from another at their outer ends; a demountable rim having an annular rib along one edge and having an annular beveled seating surface on its inner periphery seating directly on the beveled seats at the ends of the spokes, the rim bridging the space between the spokes and having the major portion if its width axially overhanging the seats; and clamping means detachably engaging a wall of the rim opposite the beveled seating surface of the rib forcing the seating surface into clamping engagement with the seats.

2. In a wheel, the combination of a wheel center comprising spokes having beveled seats on the spoke ends, said spoke ends being separated one from another circumferentially; a demountable rim having an annular corrugation formed in its walls at one edge of the rim, the upper face of the corrugation forming and providing an annular gutter for receiving a lock for a tire retaining flange on the rim and the under-face of the corrugation forming an annular beveled seating surface seating directly on the seats at the ends of the spokes, the rim bridging and sustaining the load between the spokes and sustaining the load in overhanging relation axially from the seats; and separate clamping means in thrust engagement with the outer wall of the gutter forcing the inclined beveled seating surface of the gutter into clamping engagement with said seats.

3. In a wheel, the combination of a wheel center comprising spokes having beveled seats on the spoke ends, said spokes being separated one from another at their outer ends; a demountable rim having an annular rib along one edge and having an annular beveled seating surface on its inner periphery seating directly on the beveled seats at the ends of the spokes, the rim bridging the space between the spokes and having the major portion of its width axially overhanging the seats; an endless flange ring mounted over the tapered seating surface; and clamping means detachably engaging a wall of the rim opposite the beveled seating surface of the rim forcing the seating surface into clamping engagement with the seats.

4. In a wheel, the combination of a wheel center comprising spokes having beveled seats on the spoke ends, said spoke ends being separated one from another circumferentially; a demountable rim having an annular corrugation formed in its walls at one edge of the rim, the upper face of the corrugation forming and providing an annular gutter for receiving a lock for a tire retaining flange on the rim and the under-face of the corrugation forming an annular beveled seating surface seating directly on the seats at the ends of the spokes, the rim bridging and sustaining the load between the spokes and sustaining the load in overhanging relation axially from the seats; an endless flange ring mounted over the tapered seating surface; and separate clamping means in thrust engagement with the outer wall of the gutter forcing the inclined beveled seating surface of the gutter into clamping engagement with said seats.

In testimony whereof I have hereunto set my hand.

JEWELL W. VANDERVEER.